United States Patent [19]

Fujii et al.

[11] Patent Number: 5,396,294
[45] Date of Patent: Mar. 7, 1995

[54] DIGITAL CHROMINANCE SIGNAL DEMODULATION APPARATUS

[75] Inventors: Kunihiko Fujii; Naoshi Usuki, both of Osaka, Japan

[73] Assignee: Matsushita Electric Industrial Co., Ltd., Osaka, Japan

[21] Appl. No.: 73,889

[22] Filed: Jun. 9, 1993

[30] Foreign Application Priority Data

Jun. 9, 1992 [JP] Japan ................................ 4-149169

[51] Int. Cl.$^6$ ..................... H04N 9/89; H04N 9/84; H04N 9/87; H04N 9/83
[52] U.S. Cl. .................................. 348/508; 348/505; 348/507; 348/641; 348/639; 358/310
[58] Field of Search ............... 358/23, 19, 35, 38, 358/40, 310, 328, 329, 330; H04N 9/84, 9/83, 9/87, 9/89; 348/641, 727, 639, 638, 453, 505, 507, 508

[56] References Cited

U.S. PATENT DOCUMENTS

| | | | |
|---|---|---|---|
| 4,686,560 | 8/1987 | Balaban et al. | 348/508 |
| 4,689,664 | 8/1987 | Moring et al. | 348/639 |
| 4,724,476 | 2/1988 | Nakagawa et al. | 358/310 |
| 4,974,082 | 11/1990 | Heitman | 348/537 |
| 5,062,004 | 10/1991 | Winterer et al. | 358/310 |

FOREIGN PATENT DOCUMENTS

| | | | |
|---|---|---|---|
| 3731767 | 3/1989 | Germany | H04N 9/89 |
| 3738092 | 5/1989 | Germany | H04N 9/89 |
| 61-184992 | 8/1986 | Japan | H04N 9/84 |
| 61-263393 | 11/1986 | Japan | H04N 9/89 |
| 238793 | 4/1988 | Japan | H04N 9/83 |
| 19096 | 1/1990 | Japan | H04N 9/83 |
| 192391 | 7/1990 | Japan | H04N 9/89 |
| 192392 | 7/1990 | Japan | H04N 9/89 |

OTHER PUBLICATIONS

T. Matsumoto et al., "All Digital Video Signal Process System for S-VHS VCR", *IEEE Transactions on Consumer Electronics*, vol. 36, No. 3, pp. 560-566 (Aug. 1990).

*Primary Examiner*—James J. Groody
*Assistant Examiner*—Glenton B. Burgess
*Attorney, Agent, or Firm*—Ratner & Prestia

[57] ABSTRACT

Different from typical signal processing which employs a feedback control, by adopting a demodulating circuit employing AFC, which is not affected by a comb filter, the response characteristic against jitter is improved and a down converted chrominance signal can be demodulated with a good accuracy. Therefore, the noise rejection effect by a comb filter is improved, the detecting accuracy of the residual phase error is also improved, and the S/N ratio of the phase is improved by combining feedforward APC compensation with a velocity error, and this results in a much improved picture quality.

2 Claims, 6 Drawing Sheets

DIGITAL CHROMINANCE SIGNAL DEMODULATION APPARATUS

BACKGROUND OF THE INVENTION

1. Field of the Invention

This invention relates to chrominance signal processing in a commercial video cassette recorder (VCR) and handles demodulation from a down converted chrominance signal into a color difference signal by digital signal processing.

2. Description of the Prior Art

Recently, various systems have been proposed to improve the performance of a VCR by introducing digital signal processing.

In the case of a chrominance signal, although a signal format is stipulated as a signal standard, there is no particular standard on signal processing. Therefore, a circuit configuration suitable for digital processing can be adopted with some flexibility.

A digital chrominance signal processing apparatus proposed for a VHS system is explained below.

For example, according to a Japanese patent publication no. 4-4799 (Feb. 12, 1985, "a chrominance signal processing apparatus") which is incorporated herein by reference, a reproduced down converted carrier chrominance signal is demodulated at a demodulator after being A/D-converted.

Phase error is detected from a color difference signal (R-Y) of the two demodulated color difference signals at a burst gate circuit. The error signal is D/A-converted, a clock signal corresponding to input jitter frequency is generated by controlling an analog variable frequency oscillator, and by applying the clock signal to the A/D converter and the demodulator mentioned above, a feedback APC (Automatic Phase Control) loop is completed.

But, in this feedback APC loop, if a quick response occurs, one signal processing becomes unstable and, moreover, when a cross-talk component exists in the reproduced signal such as in a long play mode, a comb filter is necessary in the loop. Thus, it is easy for the signal processing to become unstable.

Therefore, in the publication mentioned above, in order to improve upon the deficiency, an improvement of the response characteristic is attempted which includes adopting a feedforward APC in the output of the feedback APC. In particular, a phase error at a present line is calculated using burst signals and the color difference signals (R-Y) and (B-Y), and a vector operation to restore it to the normal demodulation axis is performed by an operation circuit.

A chrominance signal processing apparatus, as described in IEEE Trans. on CE, vol. 36, no. 3, Aug. 1990, p. 560-566, which is incorporated herein by reference, has basically the same configuration as the above-mentioned publication; however, it is different in that the feedback loop is digitally processed.

In the prior art, as a feedback APC is adopted for color demodulation, a high frequency jitter component cannot be removed. Moreover, when a comb filter exists in the loop, the response characteristic against jitter becomes worse.

Thus, if a color difference signal, in which the jitter component is not sufficiently removed, is passed through a comb filter, an intrinsic filter characteristic cannot be obtained and the ability to reject a cross-talk component and a noise component decreases.

As a result, because the detecting accuracy of a phase error from a burst signal decreases, the jitter suppressing effect becomes insufficient, even in the feedforward APC adopted in order to improve the response characteristic.

SUMMARY OF THE INVENTION

The present invention relates to a digital chrominance signal demodulation apparatus which includes:

carrier generator means for outputting two orthogonal carriers based on a first input signal and a second input signal;

demodulator means for demodulating a down converted carrier chrominance signal, which is a reproduced signal of a video cassette recorder, by the outputs of said carrier generator means and for outputting a first color difference signal an a second color difference signal;

first comb filter means and second comb filter means for comb filtering said first color difference signal and said second color difference signal, respectively and for producing respective outputs;

first delay means and second delay means for delaying the outputs of said first comb filter means and said second comb filter means by a predetermined period, respectively;

phase error detector means for detecting a residual phase error in the output of said first comb filter means and the output of said second comb filter means during a Bate pulse and producing an output; and phase error compensator means for compensating the residual phase error in the outputs of said first delay circuit and said second delay circuit by employing the output of said phase error detector.

A down converted carrier chrominance signal is demodulated with two orthogonal carriers generated in the carrier generator.

The two demodulated color difference signals are applied to the phase error detector and to delay circuits through respective comb filters. The two color difference signals delayed by a specified period through the delay circuits are compensated at the phase error compensator according to a phase error signal from the phase error detector. Thus, high quality color difference signals with no jitter component can be obtained at the output of the phase error compensator.

According to the present invention, the response characteristic is improved as compared with an APC type, because demodulation is done only in an AFC (Automatic Frequency Control) circuit which has no feedback loop.

Therefore, comb filters can remove a cross-talk component and a noise component as an intrinsic characteristic and the detecting accuracy of the residual phase error is improved. In addition, by adopting a phase error compensation with a high performance feedforward type, a higher jitter suppression effect is obtained.

DETAILED DESCRIPTION OF THE INVENTION

Figure 1:
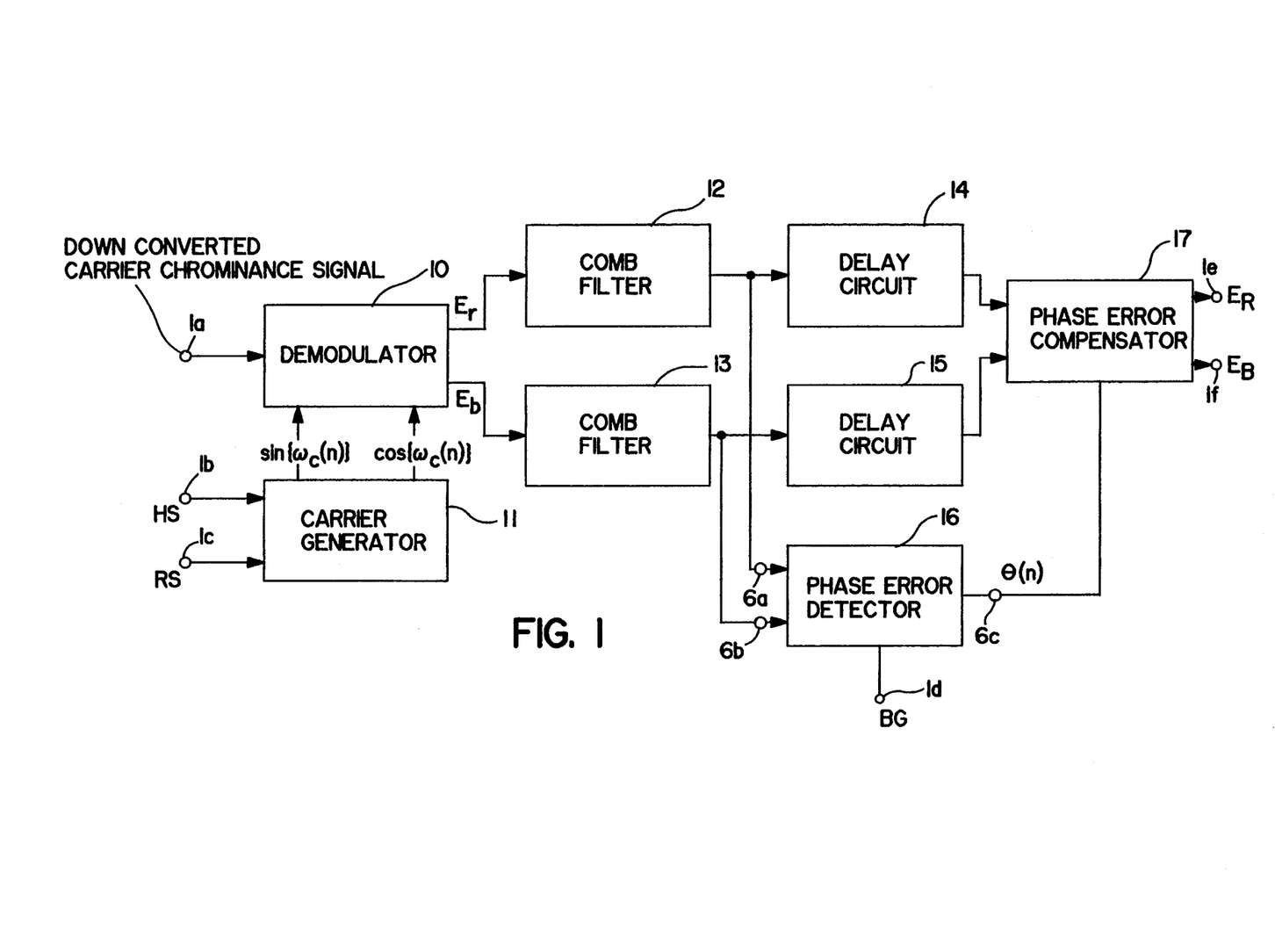
FIG. 1 is a block diagram of digital chrominance signal demodulation apparatus in accordance with an exemplary embodiment of the present invention.

An exemplary embodiment of the present invention is illustrated by FIGS. 1 through 6. FIG. 1 is a block diagram of an exemplary embodiment of a digital chrominance signal demodulation apparatus.

A down converted carrier chrominance signal is applied to the input terminal 1a and two orthogonal carriers generated in the carrier generator 11 are input to the demodulator 10. In the demodulator 10, demodulation by synchronous detection is performed and undesired components of the signal generated at the synchronous detection are removed. Two color difference signals Er and Eb are obtained at the outputs of the demodulator 10.

Here, the carrier generated in the carrier generator 11 is synchronized with a frequency which is 40 times the horizontal sync (HS) frequency. A block diagram of the carrier generator 11 is shown in FIG. 2.

Figure 2:
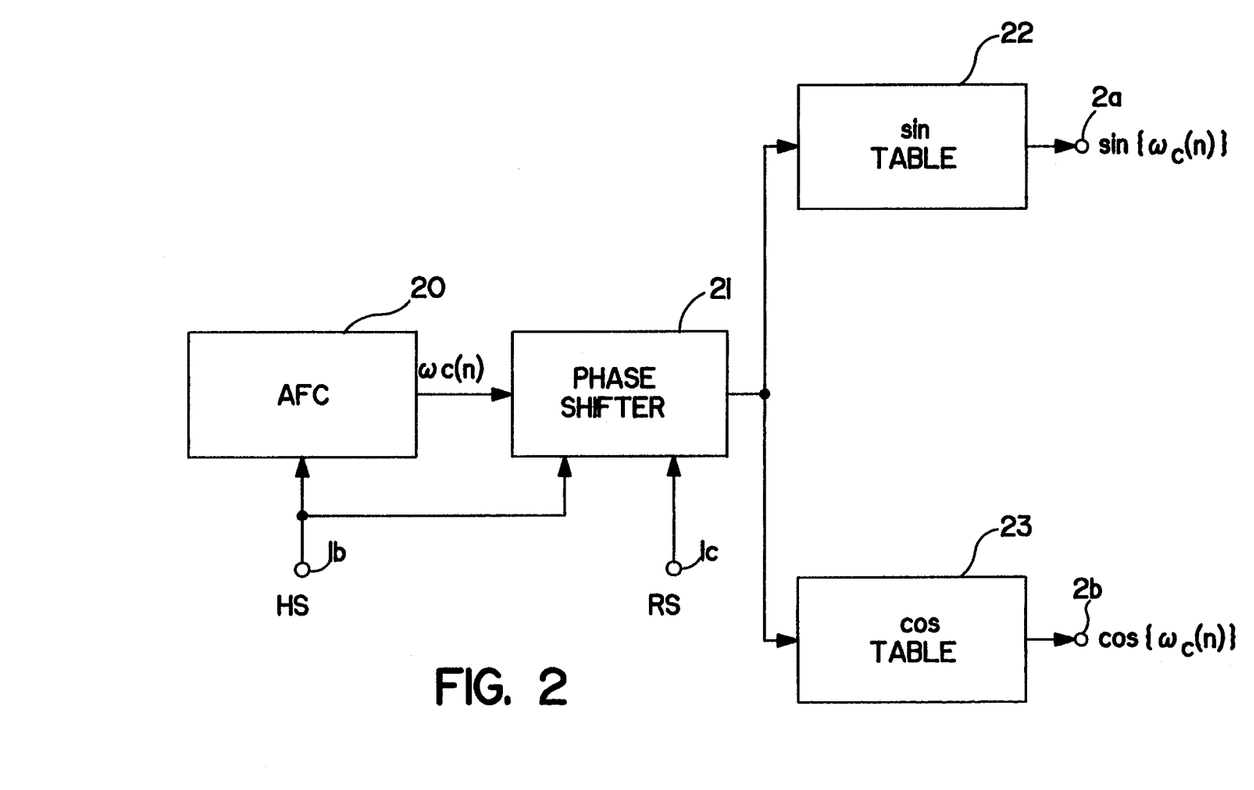
FIG. 2 is a block diagram of a carrier generator 11 in FIG. 1.

Referring to FIG. 2, a sawtooth wave $\omega c(n)$ (where n is a natural number), having 40 periods during each period of a HS pulse, is generated at the automatic frequency control circuit AFC 20. The HS is applied to the terminal 1b and the sawtooth wave is synchronized with the HS signal.

Next, the phase of the sawtooth wave $\omega c(n)$ is shifted by 90 degrees (lead or lag) during every period of a horizontal sync pulse (HS) according to the polarity of a rotary signal (RS) applied to the input terminal 1c of the phase shifter 21.

Carriers, which are orthogonal to each other and expressed as $\sin\{\omega c(n)\}$ and $\cos\{\omega c(n)\}$, are output from a sin-Table 22 and cos-Table 23, respectively.

Figure 3A:
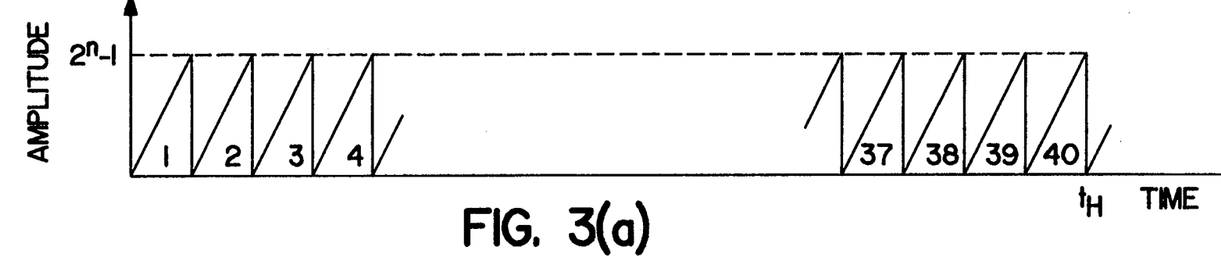
FIGS. 3a and 3b illustrates waveforms of an AFC 20 and a phase shifter 21 in FIG. 2.
Figure 3B:
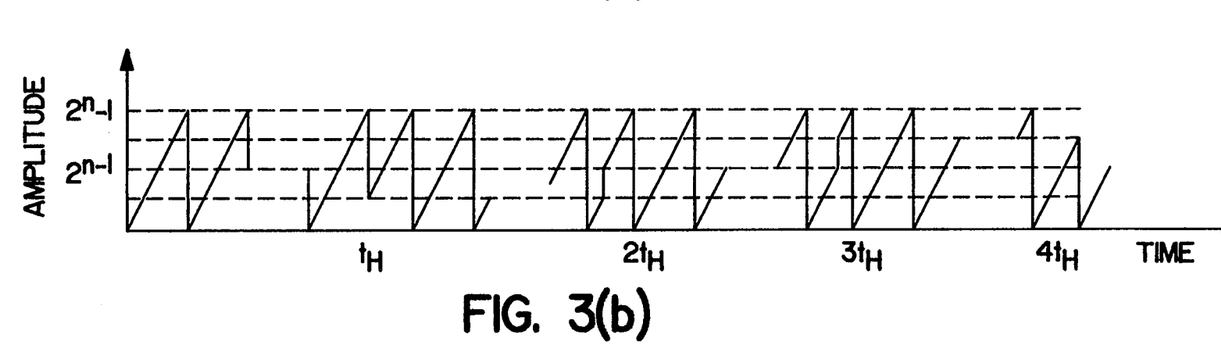

FIGS. 3a and 3b show waveforms illustrating the performance of AFC 20 and phase shifter 21 in FIG. 2. FIG. 3(a) is a waveform of the output $\omega c(n)$ of the AFC 20. Assuming its dynamic range is $2^n$, it has 40 cycles of sawtooth waves during a period $t_H$, where $t_H$ is horizontal sync period.

FIG. 3(b) shows that the phase of the output of the phase shifter 21 is shifted by 90 degrees every period $t_H$. (Here, it is illustrated that the phase is leading.)

As the dynamic range is $2^n$, the phase information of 90 degrees is expressed by $2^{(n-2)}$. Therefore, in order to lead the phase by 90 degrees every period $t_H$, the value $2^{(n-2)}$ is added one after another to the value $\omega c(n)$ every period $t_H$. Thus, the phase leads by 360 degrees every four periods $4t_H$. But, as the carrier generator 11 includes AFC 20, the generated carrier can respond only to frequency.

Therefore, when the down converted carrier chrominance signal is modulated by a signal with frequency $\omega c(n)$ and phase $\theta$, the color difference signals Er and Eb passed through the comb filters 12 and 13, respectively, are demodulated such that the demodulation axis is deviated by an initial phase $\theta$.

Figure 4A:
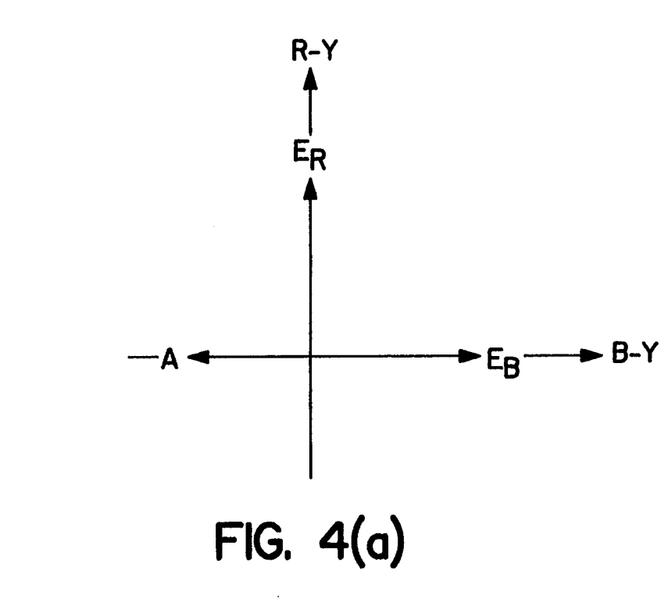
FIGS. 4a and 4b are vector diagrams showing a relation between demodulation axes of an NTSC signal and a signal having a phase difference of $\theta$.
Figure 4B:
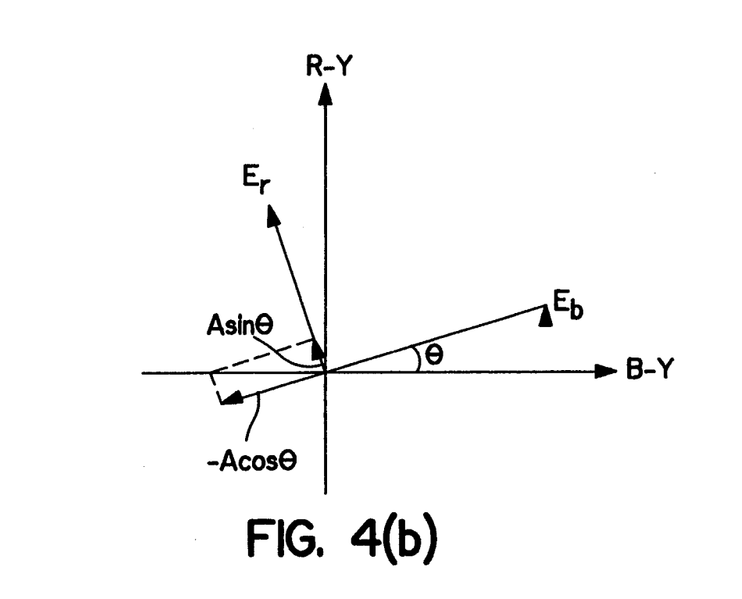

This is shown in FIGS. 4(a) and 4(b). FIG. 4(a) is a vector diagram of the case in which the down converted carrier chrominance signal is demodulated with a normal demodulation axis. Er, Eb, and A express amplitudes of a red color difference signal (R-Y), a blue color difference signal (B-Y), and a burst signal, respectively.

FIG. 4(b) is a vector diagram of the case in which the down converted carrier chrominance signal is demodulated with a demodulation axis of an uncompensated initial phase $\theta$.

Er and Eb are color difference signals (R-Y) and (B-Y), respectively, and A is a burst signal which has components Ar and Ab expressed by eq. (1) and eq. (2) on the axes (R-Y) and (B-Y), respectively.

$$Ar = A \cdot \sin\theta \qquad \text{eq. (1)}$$

$$Ab = -A \cdot \cos\theta \qquad \text{eq. (2),}$$

and the relationship between ER−Er and EB−Eb is $$ER = Eb \cdot \sin\theta + Er \cdot \cos\theta \qquad \text{eq. (3),}$$

$$EB = Eb \cdot \cos\theta - Er \cdot \sin\theta \qquad \text{eq. (4).}$$

Figure 5A:
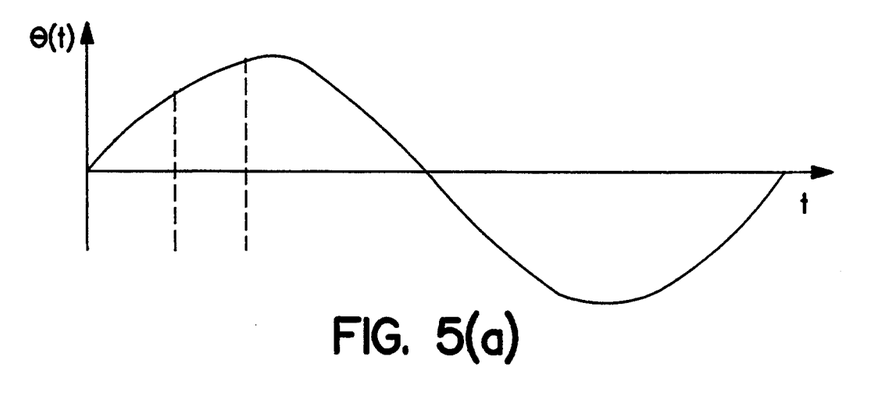
FIGS. 5(a)–5(c) illustrate waveforms showing a time base error and a velocity error in accordance with an exemplary embodiment of the present invention.

If some jitter component is left in the AFC 20 of the carrier generator 11 without being completely removed, the phase error $\theta$ is not constant but rather a function of time; in particular, it varies sinusoidally as shown in FIG. 5(a).

If the phase error $\theta(t)$ is detected only for particular values of t (or, put another way, at particular points along the x-axis of FIG. 5(a)), a step-wise function is obtained. This is called "time base error" and is shown in FIG. 5(b).

Figure 5B:
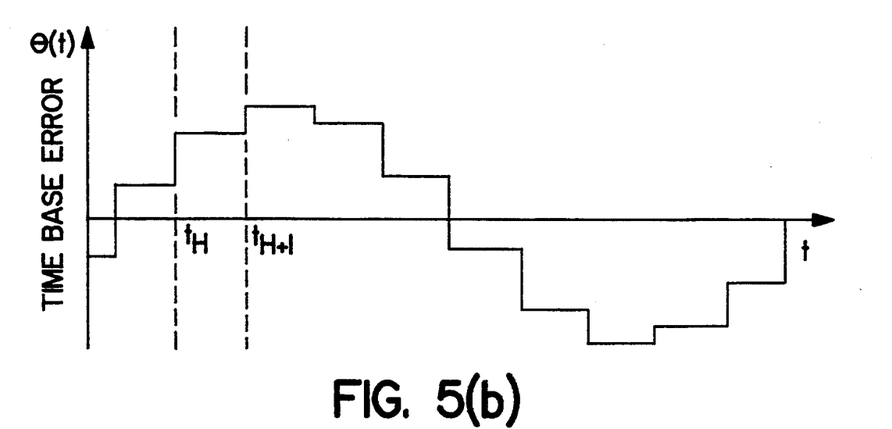
Figure 5C:
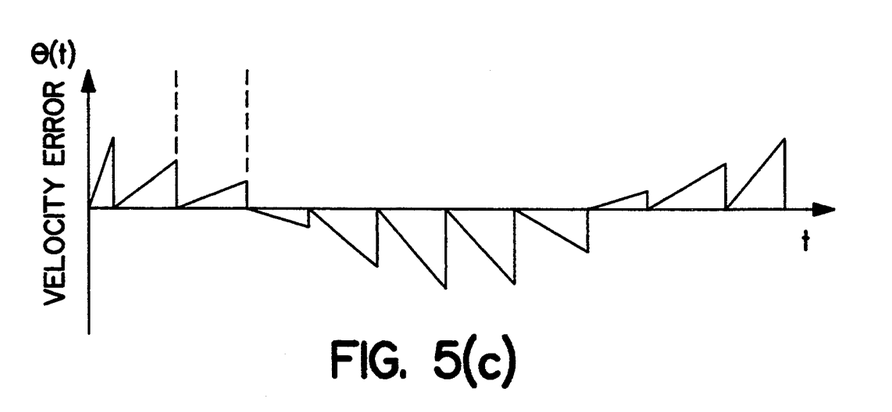

However, if the error compensation is done only by a phase error $\theta(t_H)$ detected at the time $t_H$ in FIG. 5(b), a phase error as shown in FIG. 5(c) is obtained at time $t_{H+1}$. In other words, the gradient of $\theta(t)$ values along neighboring points t is generated. This pseudo-sawtooth is called a "velocity error" and is shown in FIG. 5(c).

In order to improve the jitter characteristic, the phase error of the first degree holding characteristic should be compensated for every sampling during a line.

Figure 6:
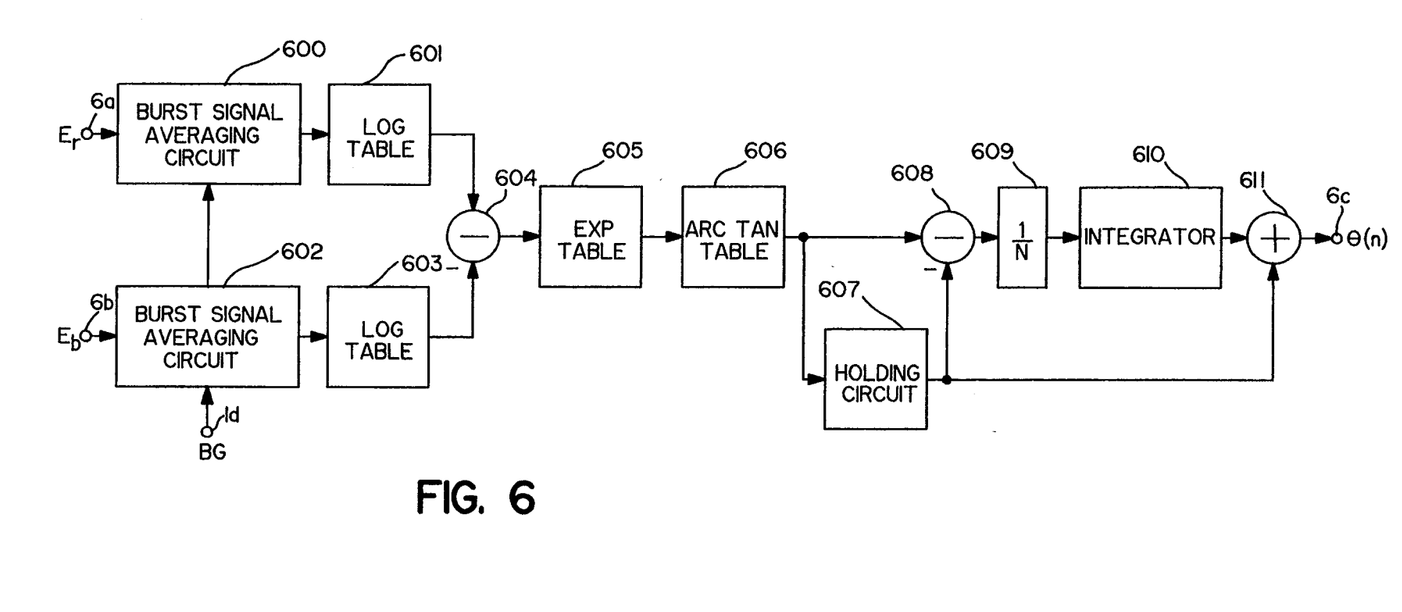
FIG. 6 is a block diagram of a phase error detector 16 in FIG. 1.

FIG. 6 shows a block diagram of a phase error detector 16, which detects a velocity error and calculates a compensation data at every sampling. If color difference signals applied to the input terminals 6a and 6b are the signals at the time $t_{H+1}$ in FIG. 5(b), i.e. the signal of the (H+1)th line, the amplitudes of the burst signals are expressed by eq. (5) and eq. (6), respectively.

$$Ar_{H+1} = A_{H+1} \cdot \sin\theta_{H+1} \qquad \text{eq. (5)}$$

$$Ab_{H+1} = -A_{H+1} \cdot \cos\theta_{H+1} \qquad \text{eq. (6)}$$

These signals are averaged during the period of the burst gate pulse (BG), which is applied to the input terminal 1d, at the burst signal averaging circuits 600 and 602, and are logarithmically transformed at the log-Table 601 and 603, respectively, and then they are subtracted at the first subtracter 604 in FIG. 6.

The output of the first subtracter 604 is expressed by eq. (7).

$$\log(A_{H+1} \cdot \sin\theta_{H+1}) \text{''} \log(A_{H+1} \cdot \cos\theta_{H+1}) = \log(-\tan\theta_{H+1}) \qquad \text{eq. (7)}$$

This signal is exponentially transformed at the exp-Table 605. Next, it is transformed to its arc-tangent value at the arctan-Table 606. Thus, the time base error $\theta_{H+1}$ during the (H+1)th line is calculated.

At the holding circuit 607, a time base error $\theta$ for the previous line is held and, a velocity error is calculated as $(\theta_{H+1}-\theta_H)$ at the second subtracter 608. This value is divided by N at the 1/N circuit 609, where N is a number of sampling data during one line. The output of the 1/N circuit 609 is integrated at the integrator 610 and its output and the output of the holding circuit 607 are added to each other at the adder 611. At the output terminal 6c of the adder 611, a compensation data $\theta(n)$, (wherein n is $0 \leq n \leq N-1$) at every sampling is obtained and it is expressed by eq. (8).

$$\Theta(n) = \theta_H + (\theta_{H+1} - \theta_H) \cdot n/N \qquad \text{eq. (8)}$$

The outputs of the comb filters 12 and 13 are input to the delay circuit 14 and 15, respectively which delay the outputs for a predetermined period of time. This is because the object of compensation is the previous color difference signal. To calculate a compensation data, from the phase error between two adjoining lines is used. For a delay circuit, a line memory may be used.

The color difference signals Er and Eb, which are the outputs of the delay circuits 14 and 15, and the compensation data $\theta(n)$, which is the output of the phase error detector 16, are used to calculate by way of eq. (3) and eq. (4) at the phase error compensator 17, the color difference signals ER and EB which are $\theta'(n)=0$. This means that an output having residual jitters almost completely removed are obtained at the output terminals 1e and 1f of the phase error compensator 17.

Thus, by adopting an AFC type in the carrier generator 11, it becomes possible to get a full performance of feedforward APC which cannot be achieved with a usual feedback APC type.

In the invention explained above, color difference signals always pass through comb filters but another circuit configuration, in which the comb filters are switched to on or off according to whether the recording is in a long play mode or in a standard mode, is also possible.

Although the explanation was given regarding an NTSC system, this apparatus is adaptable to all signal processing employing a down converting method such as PAL system.

An advantage of this invention is that by employing an AFC circuit with a better response characteristic as compared with feedback APC, chrominance signal demodulation with improved accuracy is obtained. Moreover, in this invention, the same response characteristic is realized in a standard mode and in a long play mode, as they are not affected by comb filters.

Furthermore, as a cross-talk component and a noise component are completely removed in a comb filter, the detecting accuracy of the residual phase error (time base error) is also increased and it results in the velocity error being accurately calculated. This results in sufficient compensation at every sampling and a substantially improved chrominance signal quality.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A digital chrominance signal demodulation apparatus comprising:
    carrier generator means for outputting two orthogonal carriers based on a first input signal and a second input signal;
    demodulator means for demodulating a down converted carrier chrominance signal, which is a reproduced signal of a video cassette recorder, by the outputs of said carrier generator means and for providing a first color difference signal and a second color difference signal;
    first comb filter means and second comb filter means for comb filtering said first color difference signal and said second color difference signal, respectively and for producing respective outputs;
    first delay means and second delay means for delaying the outputs of said first comb filter means and said second comb filter means by a predetermined period, respectively;
    phase error detector means for detecting a residual phase error in the output of said first comb filter means and the output of said second comb filter means during a gate pulse and producing an output; and
    phase error compensator means for compensating the residual phase error in the outputs of said first delay circuit and said second delay circuit by employing the output of said phase error detector.

2. A digital chrominance signal demodulation apparatus comprising: carrier generator means for outputting two orthogonal carriers based on a first input signal and a second input signal;
    demodulator means for demodulating a down converted carrier chrominance signal, which is a reproduced signal of a video cassette recorder, by the outputs of said carrier generator means and for providing a first color difference signal and a second color difference signal;
    first comb filter means and second comb filter means for comb filtering said first color difference signal and said second color difference signal, respectively and for producing respective outputs;
    first delay means and second delay means for delaying the outputs of said first comb filter means and said second comb filter means by a predetermined period, respectively;
    phase error detector means for detecting a residual phase error in the output of said first comb filter means and the output of said second comb filter means during a gate pulse and producing an output; and
    phase error compensator means for compensating the residual phase error in the outputs of said first delay circuit and said second delay circuit by employing the output of said phase error detector;
    said carrier generator means includes an automatic frequency control circuit, a phase shifter, a sin-table, and a cos-table; and
    wherein said carrier generator means generates the two carriers such that they are synchronized as a function of a modulation frequency of the down converted carrier chrominance signal and a phase shift signal during every line.

* * * * *

UNITED STATES PATENT AND TRADEMARK OFFICE
CERTIFICATE OF CORRECTION

PATENT NO. : 5,396,294
DATED : March 7, 1995
INVENTOR(S) : Kunihiko Fujii and Naoshi Usuki It is certified that error appears in the above-indentified patent and that said Letters Patent is hereby corrected as shown below:

In Col. 2, line 33, delete "Bate" and insert therefor --gate--.

In Col. 4, line 66, Equation 7 should read as follows:

$$\log(A_{H+1} \cdot \sin \theta_{H+1}) - \log(A_{H+1} \cdot \cos \theta_{H+1})$$
$$= \log(\tan \theta_{H+1}) \qquad \text{eq. (7)}$$

Signed and Sealed this

Eighteenth Day of July, 1995

Attest:

BRUCE LEHMAN

*Attesting Officer*  *Commissioner of Patents and Trademarks*